(12) United States Patent
Rajendraprasad

(10) Patent No.: US 9,619,756 B2
(45) Date of Patent: Apr. 11, 2017

(54) METHODS AND SYSTEMS FOR MANAGING AND AUTOMATING USER CUSTOMIZATION OF A DEVICE BASED ON OBSERVED USER BEHAVIOR

(71) Applicant: Apple Inc., Cupertino, CA (US)

(72) Inventor: Vinuprasad Rajendraprasad, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 14/155,265

(22) Filed: Jan. 14, 2014

(65) Prior Publication Data
US 2015/0199616 A1    Jul. 16, 2015

(51) Int. Cl.
*G06N 99/00*   (2010.01)
*G06F 9/445*   (2006.01)

(52) U.S. Cl.
CPC ....... *G06N 99/005* (2013.01); *G06F 9/44505* (2013.01)

(58) Field of Classification Search
None
See application file for complete search history.

(56) References Cited

U.S. PATENT DOCUMENTS

2010/0191556 A1* 7/2010 Kalscheuer ............ G06Q 10/10
                                                              705/321
2014/0324192 A1* 10/2014 Baskaran ............... G05B 15/02
                                                              700/19

* cited by examiner

*Primary Examiner* — Kakali Chaki
*Assistant Examiner* — Michael Zidanic
(74) *Attorney, Agent, or Firm* — Downey Brand LLP

(57) ABSTRACT

A method for managing and automating user customization of a device based on observed user behavior is disclosed. First, the method collects data on the user's activities on a device for a period of time. Second, the method learns about the user's behavior for routine repetitive operations by analyzing the user's activities data. Third, the method generates automation settings of the device based on the user's behavior for routine repetitive and predictive operations, and then presents the automation settings of the device to the user for customization of the device. These automation settings help to make the device operate more efficiently and more conveniently for the user, because they help perform the user's own routine repetitive operations.

20 Claims, 9 Drawing Sheets

METHODS AND SYSTEMS FOR MANAGING AND AUTOMATING USER CUSTOMIZATION OF A DEVICE BASED ON OBSERVED USER BEHAVIOR

FIELD

The described embodiments relate generally to methods and systems for user customization of a device, and more particularly to methods and systems for managing and automating user customization of a device based on observed user behavior.

BACKGROUND

A user for an electronic device, such as a smart phone, can create preference settings to perform routine repetitive custom operations. These preference settings can be implemented as automation settings, where each automation setting corresponds to an automated workflow of operations. As an example, a device can have an automation setting that is triggered at 7:00 am in the morning to execute an audio alarm to wake up a user. These automation settings can help the device operate more efficiently, as well as help make the device more convenient for the user to use.

At the same time, it is possible to determine some of these routine repetitive custom operations by observing a user's behavior for a period of time. In this regard, people are used to some regular routine in parts of their life. For example, people wake up and go to sleep around a regular time. People go to work at a specific location during a specific time frame, as well as perform some other predictable routine activities such as watching a television show during a particular time slot in the week. There can be changes in life, so that a person might change to a different routine. But usually a person follows some constant routine for a period of time. After that period of time, which can be a number of days or perhaps even a number of years, the person might adapt a new routine and then follow that routine for a new period of time.

Therefore, it is desirable to have a method for observing and learning about a user's behavior for routine repetitive operations by analyzing data collected on the user's routine activities for a period of time and to use the user's behavior learned for managing and automating customization of a device.

SUMMARY

This specification describes various embodiments that relate to methods and systems for managing and automating user customization of a device based on observed user behavior. In one embodiment, the method can include three steps. First, the method collects data on the user's activities on a device for a period of time. Second, the method learns about the user's behavior for routine repetitive operations by analyzing the user's activities data. Third, the method generates an automation setting of the device based on the user's behavior for routine repetitive operations, and then presents the automation setting of the device to the user for customization of the device.

The above method can be better understood by providing some details and examples. As for the first step of collecting data, the method can collect data of user activities based on the user's routine behavior of using certain options or turning on/off certain options on a device (e.g., turn off phone ringing). The activities data collected can also include time, location, or some other significant variables, so the dependence of the activities on these variables can be determined. As an example, phone ringing can be turned off for certain time period (e.g., during Monday 8 am-9 am weekly meeting) and location (e.g., at work). As for the second step of learning about the user's behavior, background software can be used to collect, compute, and analyze data for a given period of time. In particular, the method can collect data for 50 or 100 repetitive operations (e.g., 50 or 100 times of turning off phone ringing) or the method can collect data for a certain number of days (e.g., collect data for three weeks). In the third step, the method generates an automation setting (e.g., turn off phone ringing during Monday 8 am-9 am weekly meeting) of the device based on the user's behavior, and then presents the automation setting of the device to the user for customization of the device. In particular, the method can present the automation setting to the user as a workflow or a pictorial flow chart of operation (e.g., if time is Monday 8 am-9 am, then turn off phone ringing). Then the user can accept the automation setting with a single swipe, or further fine tune the automation setting (e.g., change the automation setting to be "if time is Monday 8 am-9 am and the location is at work, then turn off phone ringing") before accepting it.

In summary, methods and systems disclosed can utilize software logics to help user and user device adapt to changes, providing the user with pre-built automated operation workflow to create preference settings on the user device. The methods and systems disclosed include the ability to record/learn and analyze user behavior using user activities/operations performed on the user device. The methods and systems disclosed give user the options for automatically generating automation settings for performing the user's own routine repetitive custom operations, with the goal of greater convenience for the user and more efficient use of the user device.

In one embodiment, a method for managing and automating customization of a device based on learning about a user's behavior is disclosed. The method includes collecting data on the user's activities, learning about the user's behavior by analyzing the data on the user's activities, generating an automation setting of the device based on the user's behavior, and presenting the automation setting of the device to the user for customizing the device. In one embodiment, the method includes collecting data of the user's activities based on the user's usual behavior of using options on the device or turning on/off options on the device. In one embodiment, the method includes collecting data of the user's activities that includes one or more of the following variables: time, location, and a device state. In one embodiment, the automation setting of the device includes a workflow of operations that is automated based on the user's activities. In one embodiment, the method further includes implementing the automation setting of the device after the user accepts the automation setting. In another embodiment, the method further includes implementing the automation setting of the device after the user fine tunes the automation setting.

In one embodiment, a device that manages and automates customization based on learning about a user's behavior is disclosed. The device includes a processor and a memory storing computer executable instructions. The computer executable instructions, when executed by the processor, causes the processor to collect data on the user's activities, learn about the user's behavior by analyzing the data on the user's activities, generate an automation setting of the device based on the user's behavior, and present the automation setting of the device to the user for customizing the device. In one embodiment, the device collects data on the user's activities for a period of time. In one embodiment, the automation setting of the device includes a workflow of operations that is automated based on the user's activities. In one embodiment, the computer executable instructions, when executed by the processor, further causes the processor to implement the automation setting of the device after the user accepts the automation setting. In another embodiment, the computer executable instructions, when executed by the processor, further causes the processor to implement the automation setting of the device after the user fine tunes the automation setting.

In one embodiment, a computer program product encoded in a non-transitory computer readable medium for managing and automating customization of a device based on learning about a user's behavior is disclosed. The computer program product includes computer code for collecting data on the user's activities, computer code for learning about the user's behavior by analyzing the data on the user's activities, computer code for generating an automation setting of the device based on the user's behavior, and computer code for presenting the automation setting of the device to the user for customizing the device. In one embodiment, the computer program product includes computer code for collecting data on the user's activities for a period of time. In one embodiment, the automation setting of the device includes a workflow of operations that is automated based on the user's activities. In one embodiment, the computer program product further includes computer code for implementing the automation setting of the device after the user accepts the automation setting. In another embodiment, the computer program product further includes computer code for implementing the automation setting of the device after the user fine tunes the automation setting.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
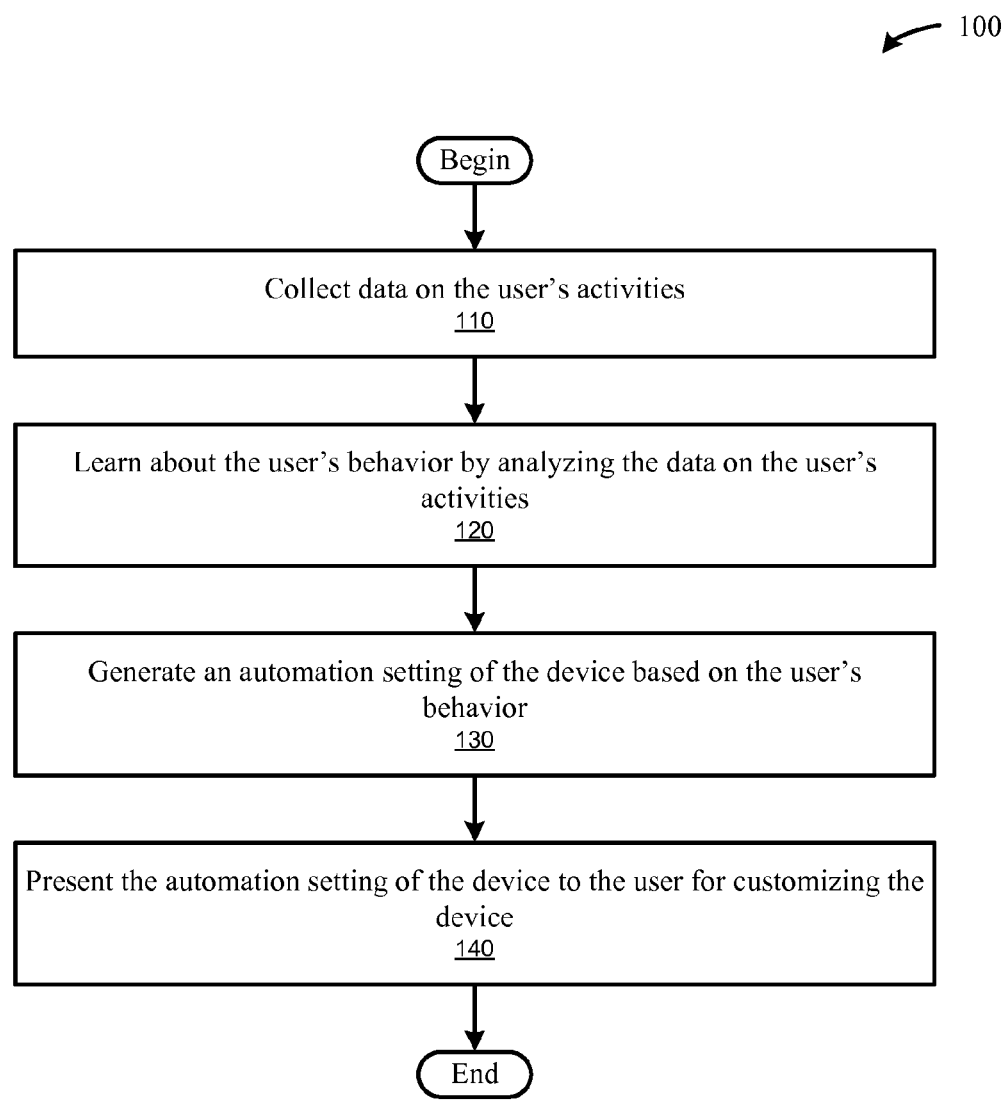
FIG. 1 shows a flow chart of method steps for managing and automating customization of a device based on observing and learning about a user's behavior, in accordance with some example embodiments.

FIG. 1 shows a flow chart of a method that can be used for managing and automating customization of a device based on observing and learning about a user's behavior, in accordance with some example embodiments. As shown in FIG. 1, the method 100 begins at step 110, where the method collects data on the user's activities. In one embodiment, the method collects data on the user's activities based on the user's usual behavior of using certain options or turning on/off certain options on a device. As an example, the option used can be WiFi (wireless local area network or WLAN) connection. Further, the WiFi connection can be turned either on or off. In a further embodiment, the method collects data on the user's activities including one or more of the following variables: time, location, and a device state. As an example, the time can be Saturday 10 am; the location can be at home; and the device state can be incoming call (i.e., in the process of receiving an incoming call). In another embodiment, the method can collect data on the user's activities including one or more of the following variables: location, time frame, battery level, charging, display, headphones, incoming call (e.g., for a phone device), missed call (e.g., for a phone device), WiFi connection, Bluetooth connection, and motion detector. Then, at step 120, the method learns about the user's behavior by analyzing the data on the user's activities. In one embodiment, the method only uses user's activities that are routine to analyze and learn about the user's behavior. As an example, a type of activity that occurs every week day (i.e., Monday to Friday) at 7 am, such as turning off WiFi after leaving home for work, can be deemed to be routine, while a type of activity that occurs only once (e.g., turning off WiFi at 10 pm on only one particular Tuesday night to do some WiFi connection test) can be deemed to be non-routine. Next, at step 130, the method generates an automation setting of the device based on the user's behavior. After step 130, the method proceeds to step 140, where the method presents the automation setting of the device to the user for customizing the device. In particular, the method can present the automation setting to the user as a workflow or a pictorial flow chart of operation (e.g., if time is Monday 8 am-9 am, then turn off phone ringing).

Figure 2:
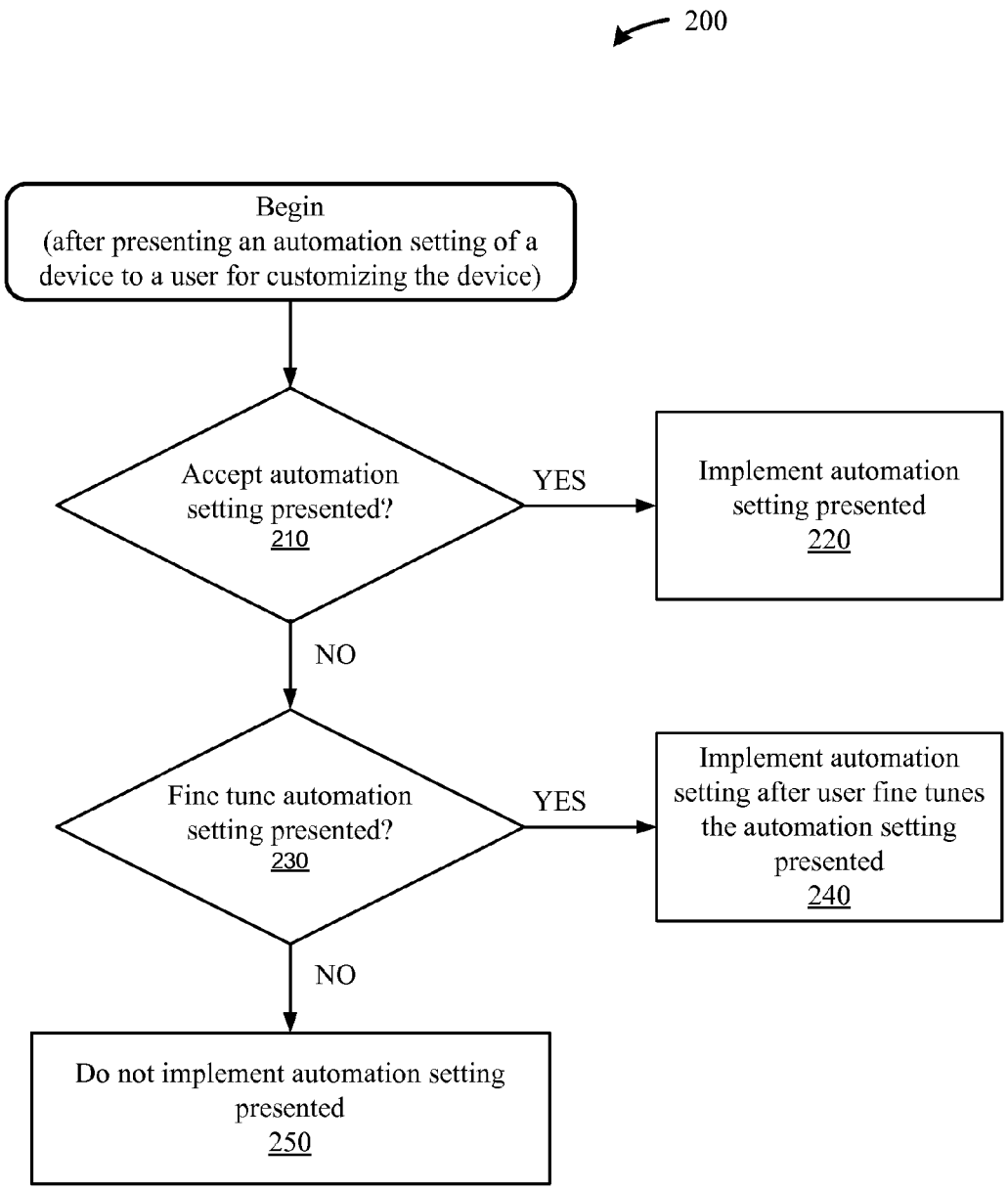
FIG. 2 shows a flow chart of method steps for accepting or fine tuning an automation setting presented to a user for customizing a device, in accordance with some example embodiments.

After step 140, the user has to decide whether the presented automation setting is to be accepted, fine tuned, or rejected. The various possibilities are shown in FIG. 2. As shown in FIG. 2, the method 200 begins after an automation setting of a device is presented to a user for customizing the device (i.e., step 140 of FIG. 1). Then, at step 210, the user decides whether to accept the automation setting of a device that is presented. If the answer is yes, then the method proceeds to step 220, where the method implements the automation setting of the device after the user accepts the automation setting. If the answer is no, then the method proceeds to step 230, where the user decides whether to fine tune the automation setting of the device that is presented. If the answer is yes, then the method proceed to step 240, where the method implements the automation setting of the device after the user fine tunes the automation setting. If the answer is no, then the method proceeds to step 250, where the method does not implement the automation setting that is presented.

Figure 3A:
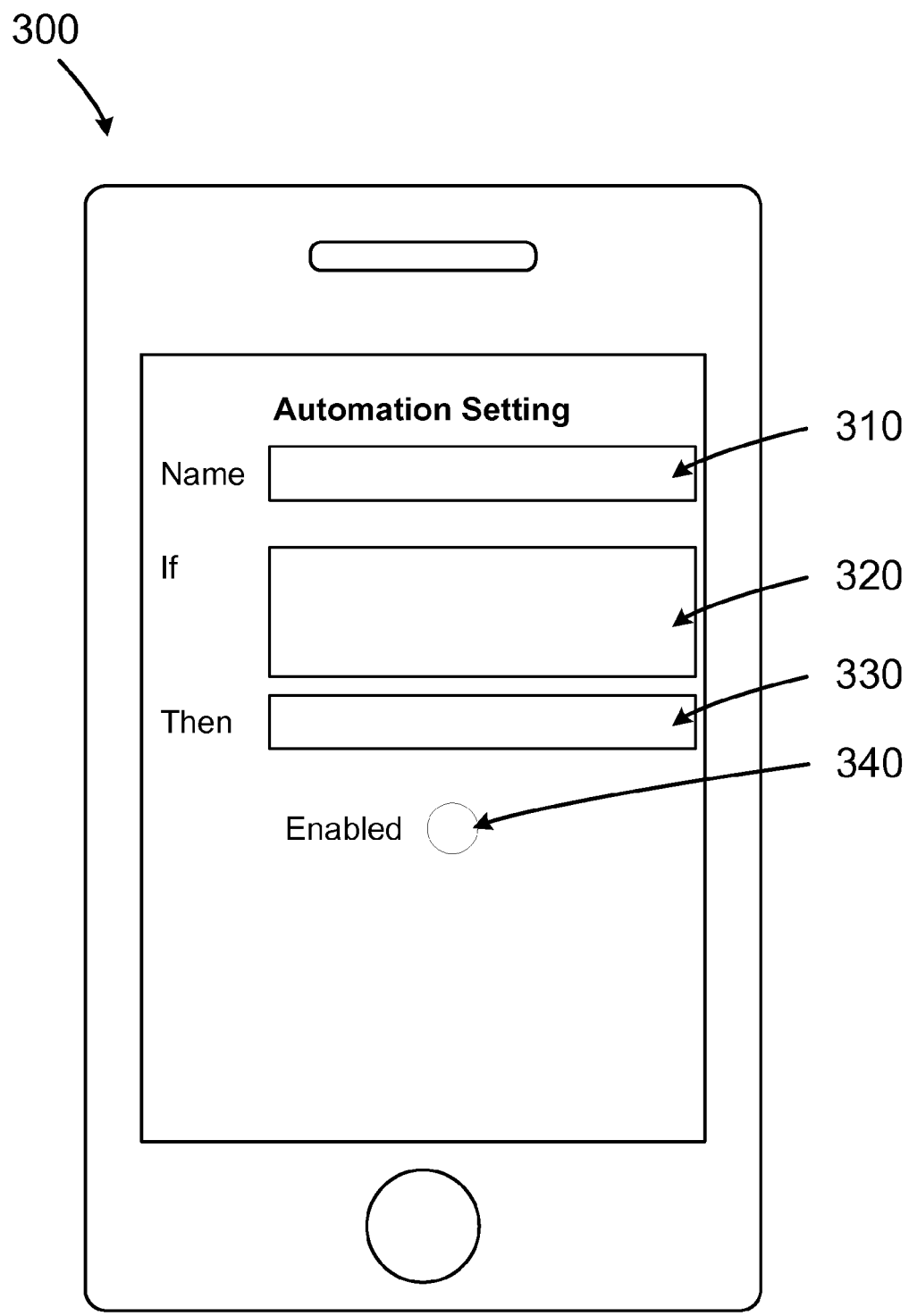
FIG. 3A shows a user interface for manually inputting an automation setting for a device (before input of an automation setting), in accordance with some example embodiments.

FIG. 3A shows a user interface for manually inputting an automation setting for a device 300 (before input of an automation setting), in accordance with some example embodiments. Device 300 can be any electronic device, such as a smart phone, a tablet computer, a pocket computer, a device integrated with a car system, or a network appliance. To manually generate an automation setting, the user needs to provide a trigger and an action. The trigger activates the action. As an example, the trigger can be the device clock detecting that the time is Monday 8 am to 9 am. The trigger can come from more than one input, so the trigger can also be the GPS (Global Positioning System), which is the device's location detector, detecting that the device is "at work". Here, "at work" corresponds to the location of the place where the user works. This can be set up either by inputting an address or by dropping a pin on a map, and further defining a radius around this location (so that everywhere within that radius can be considered part of that location). The action is an operation that will be executed when the trigger conditions are met. As an example, an action can be "to set the phone ringing to off", or "to connect to the WiFi connection", or "to disconnect from the WiFi connection". The user can input the trigger in box 320, and the action in box 330. There is also a button 340 for enabling this automation setting, and a box 310 for inputting a name for this automation setting. Other methods of inputting an automation setting are also possible, but the key points are to provide a trigger and an action, and to also indicate whether the automation setting is enabled or disabled.

Figure 3B:
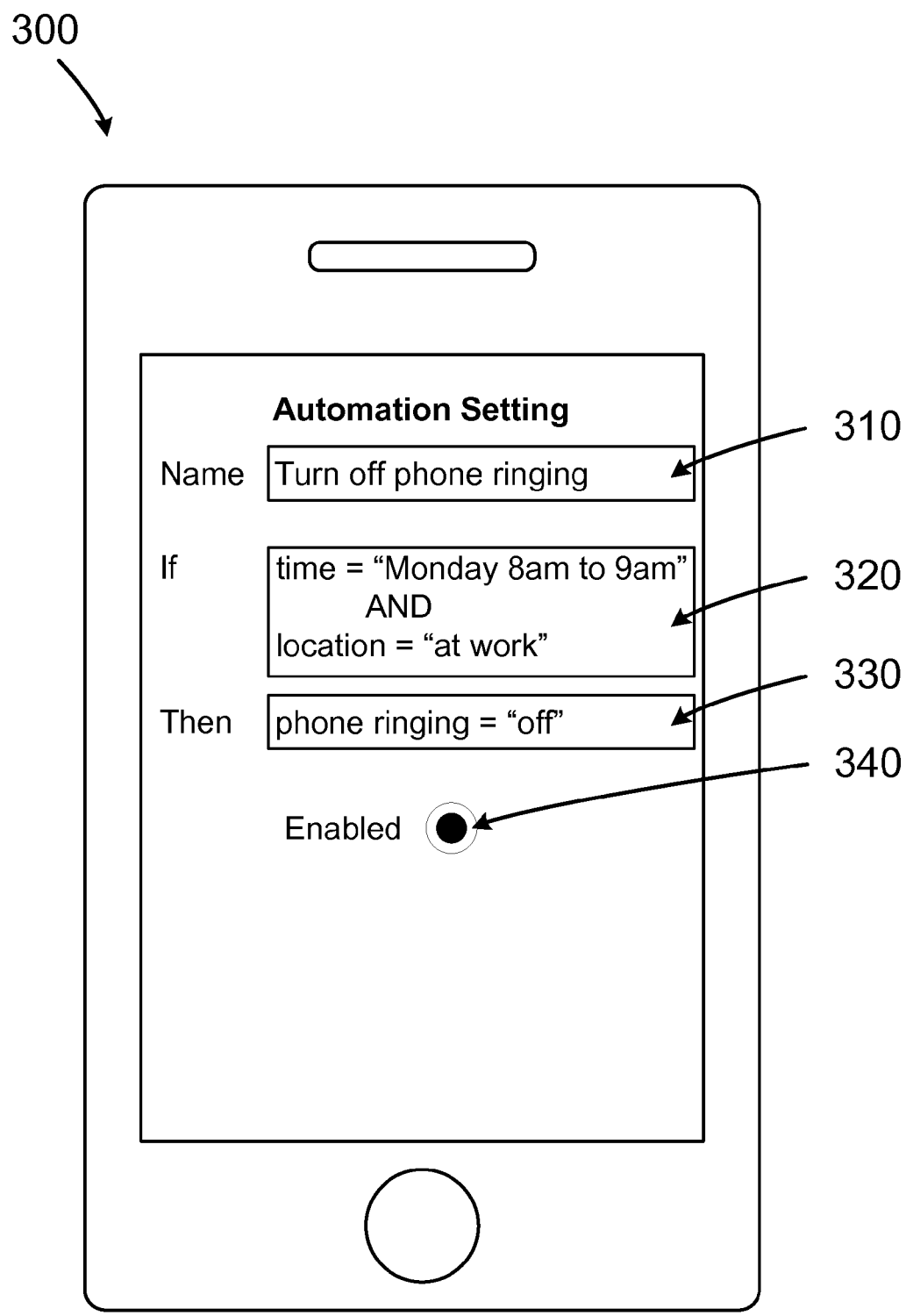
FIG. 3B shows a user interface for manually inputting an automation setting for a device (after input of an automation setting), in accordance with some example embodiments.

FIG. 3B shows a user interface for manually inputting an automation setting for a device (after input of an automation setting), in accordance with some example embodiments. In this example, the name of the automating setting is entered as "Turn off phone ringing" in box 310. The trigger is entered in box 320 as the condition: time equals "Monday 8 am to 9 am" and location equals "at work". The two inputs (time and location) are joined together by the Boolean operator "AND", which means that both conditions must be met in order for the action to be activated. In other words, the action is triggered, only when the time equals "Monday 8 am to 9 am" and the location equals "at work". In one embodiment, other Boolean operators, such as "OR" or "NOT", can also be used. The action is entered in box 330 as the phone ringing equals "off", which corresponds to turning off the phone ringing. The enable button 340 is filled in, so this automation setting has been enabled. This simple example only shows an action with a single operation (of turning off the phone ringing), but actions with more than one operations are also possible. For example, a user arriving at home (e.g., as detected by location detector GPS) can activate the action of turning on Bluetooth connection, connecting to a certain Bluetooth enabled speaker, and launching a particular application to play a specific piece of music. As described earlier, all these triggers and actions can be presented to the user as a workflow or a pictorial flow chart of operation (e.g., if location is home, then turn on Bluetooth connection, connect to Bluetooth speaker, and launch music playing application to play a specific piece of music).

The right combination of triggers and actions can help to make a device operate more efficiently and more conveniently for the user. As an example, in one embodiment, the triggers can include: time, location, and a device state. In another embodiment, the triggers can include: location, time frame, battery level, charging, display, headphones, incoming call (e.g., for a phone device), missed call (e.g., for a phone device), WiFi connection, Bluetooth connection, and motion detector. In one embodiment, the actions can include: WiFi (connect or disconnect), Bluetooth (connect or disconnect), background sync, Airplane mode (i.e., enable to suspend phone calls and text messaging), cellular data (turn on/off), send text message, send notification, play a playlist, ringer volume, ringtone, wallpaper, launch application, launch website, display website, brightness, and GPS. As such, many combinations of triggers and actions are possible. For example, if the trigger "battery level" is low, then the action can be to turn off the WiFi connection, or some other battery saving operations. As another example, the triggers of "motion detector" and "GPS" can be used to detect that a user is in a car commuting, then the action can be to turn on the Bluetooth connection to an on-car speaker to listen to music or to an on-car device for hands-free calling.

As an example, the method of FIG. 1 can be used for managing and automating customization of a device in the following simple example scenario. For instance, a user goes to the same work/school location every morning, Monday to Friday, at a similar time (say 8 am), and then comes back home every night at a similar time (say 6 pm). The user also sleeps and wakes up at substantially the same times (say sleeping from 11 pm to 7 am). For this user, after collecting the user's activities data for a given number of days, say two weeks, the method can learn that the times for leaving and coming back home are 8 am and 5 pm, as well as the fact that the user goes to the work/school location every Monday to Friday. If the user further always turns on the WiFi connection at home, then the method can learn the user's behavior for turning on the WiFi connection at home. The method can then generate an automation setting that triggers the operation of turning on WiFi connection when the device clock indicates that it is 6 pm (which is when the user is back home) and the GPS (Global Positioning System), which is the location detector, indicates that the device is at home. Alternatively, the automation setting can also be triggered by only the time, or by only the location. Further data collection and analysis can indicate that the user turns off WiFi while sleeping, but is okay with 3G (3rd generation) or 4G (4th generation) data connection turned on while sleeping. The collected data further shows that the user wakes up in the morning with the WiFi connection turn on, together with an audio alarm. But the user turns off the WiFi connection once the user leaves the house. All these aspects of the user behavior can be identified by their regularity, as evidenced by the data collected. After learning about these regular aspects of the user behavior, the method can generate automation settings for these regular aspects. As for the triggering parameters, it can either be time-based, or location-based, or both time and location based. Each of these triggering settings (i.e., time, or location, or time and location) can have its advantages or disadvantages. For example, if on some day, the user is working at home during the commute time, then a time trigger would turn off the WiFi, whereas a location trigger would still keep the WiFi turned on. Therefore, the user might want to use a location trigger together with a time trigger. In other words, if the generated automation setting is only presented with a time trigger, then the user might want to add a location trigger to the automation setting.

In one embodiment, device 300 can be used to implement the method shown in FIG. 1. When used in this manner, device 300 will first collect data on a user's activities to observe and learn about the user's behavior. Then one or more automation settings can be generated by device 300 based on the user's behavior, and presented to the user for customizing the device. As such, the user interface shown in FIG. 3B can be automatically generated and presented to the user for customizing device 300. Then the user can accept the presented automation setting by clicking on the "enabled" button 340.

Figure 4A:
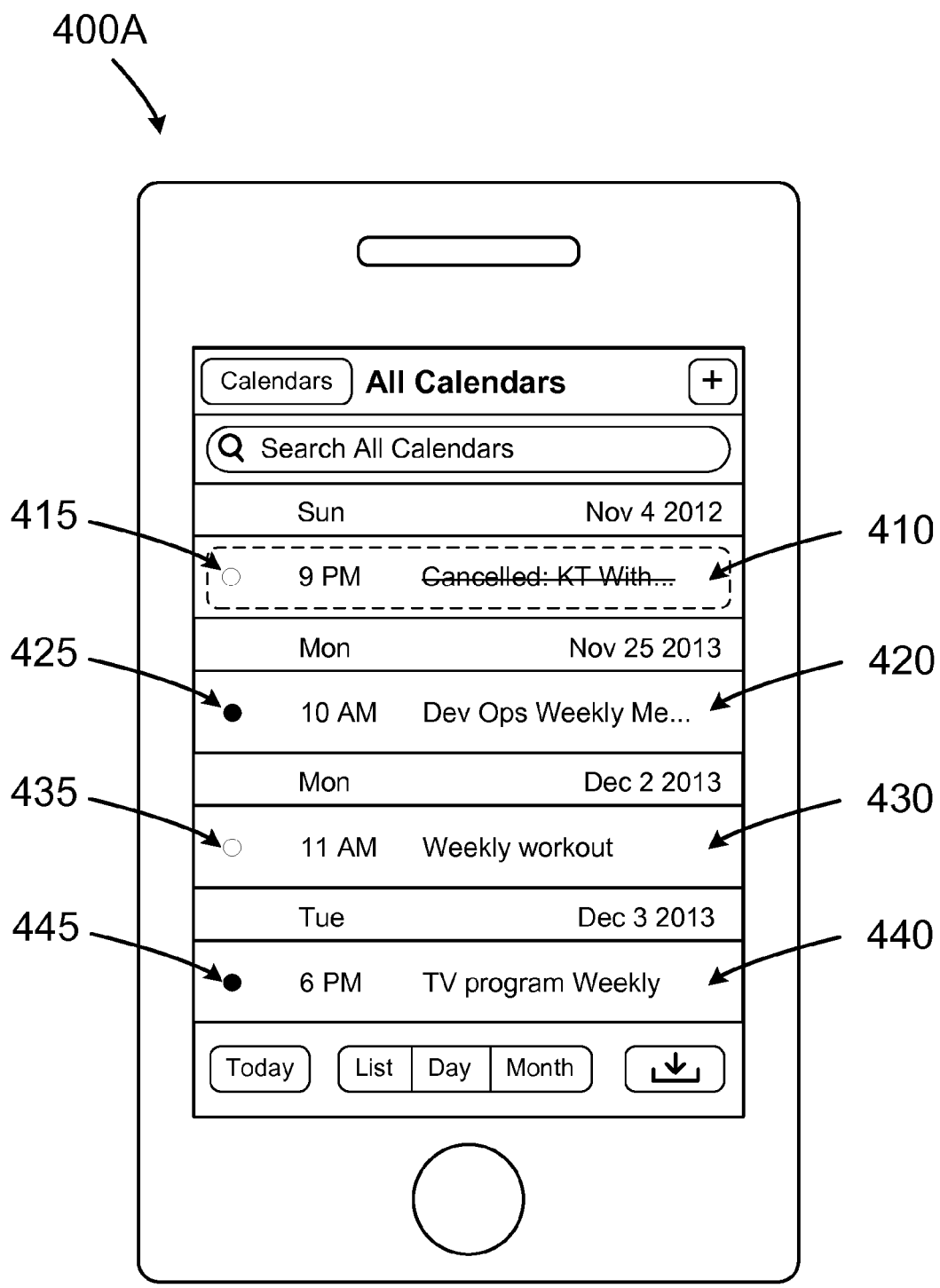
FIG. 4A shows a calendar view of a user interface for managing automation settings for a device, in accordance with some example embodiments.

FIG. 4A shows a calendar view of a user interface for managing automation settings for a device 400A, in accordance with some example embodiments. Device 400A can be any electronic device, such as a smart phone, a tablet computer, a pocket computer, a device integrated with a car system, or a network appliance. In one embodiment, device 400A can be used to implement the method shown in FIG. 1. When used in this manner, device 400A will first collect data on a user's activities to observe and learn about the user's behavior. Then one or more automation settings can be generated by device 400A based on the user's behavior, and presented to the user for customizing the device. FIG. 4A shows a calendar view for presenting the one or more automation settings to the user. In FIG. 4A, items 410, 420, 430, and 440 represent automation settings presented to the user for customizing the device 400A. In particular, item 410 represents an automation setting that has been cancelled by the user. Item 420 represents an automation setting associated with a weekly developers operational meeting. As an example, the item 420 automation setting can be an option to turn off phone ringing during the weekly developers operational meeting (i.e., if time is Monday 10 am-11 am, then turn off phone ringing). FIG. 4A shows that the item 420 automation setting can be enabled to start on Nov. 25, 2013. Item 430 represents an automation setting associated with a weekly workout meeting. As an example, the item 430 automation setting can be an option to turn off phone ringing during the weekly workout meeting (i.e., if time is Monday 11 am-11:30 am and device 400A is at workout place, then turn off phone ringing). FIG. 4A shows that the item 430 automation setting can be enabled to start on Dec. 2, 2013. Item 440 represents an automation setting associated with a weekly television program. As an example, the item 440 automation setting can be an option to turn on a television device if the user is at home (i.e., if time is Tuesday 6 pm-7 pm and device 400A is at home, then turn on the television device). FIG. 4A shows that the item 440 automation setting can be enabled to start on Dec. 3, 2013. Also shown in FIG. 4A are buttons 415, 425, 435, and 445 for enabling the corresponding automation settings (e.g., enable button 415 corresponds to automation setting 410, enable button 425 corresponds to automation setting 420, etc.). An automation setting is enabled, when the corresponding enable button has been filled in, via a select action by the user. In FIG. 4A, items 420 and 440 are enabled, while items 410 and 430 are disabled.

Figure 4B:
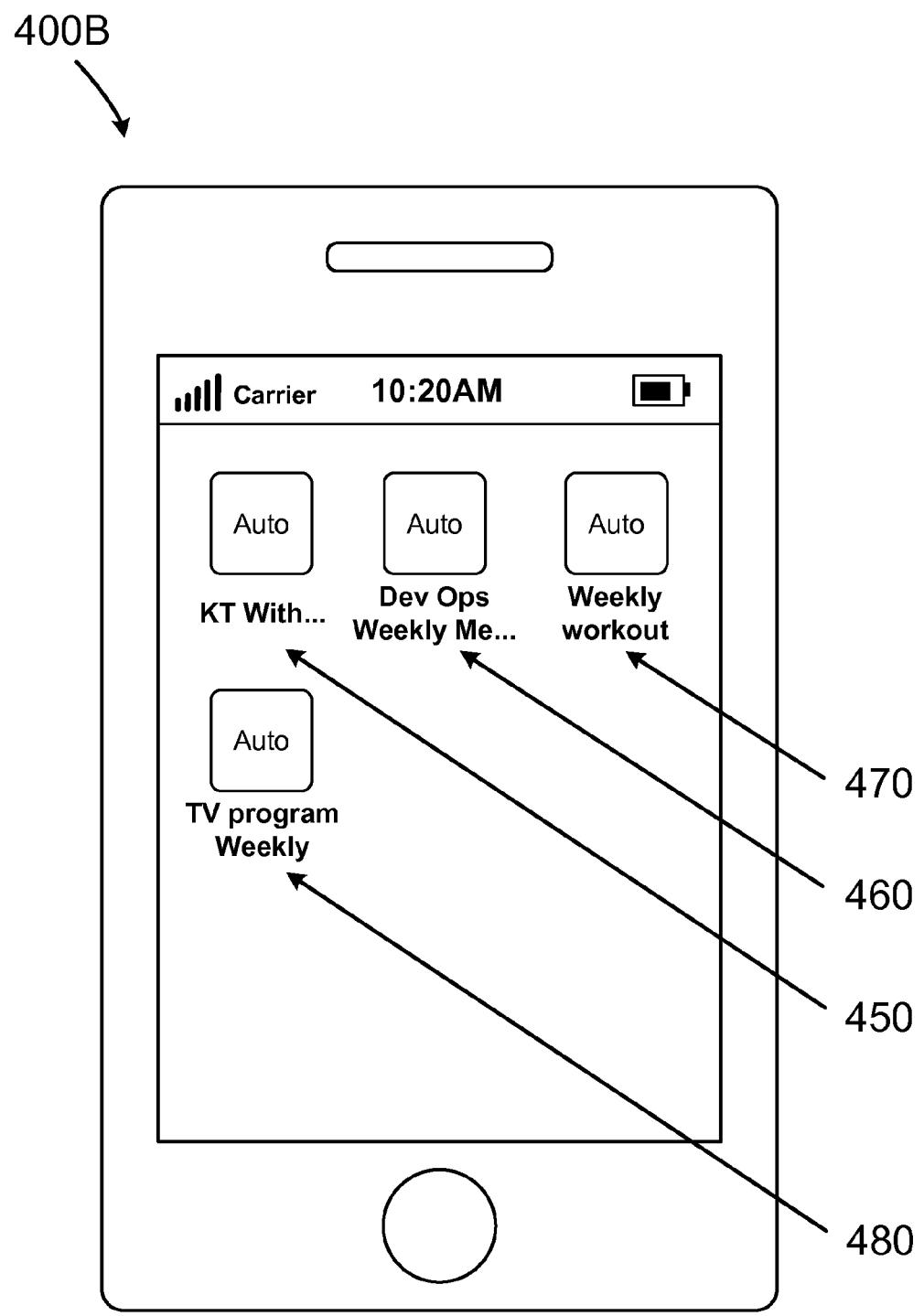
FIG. 4B shows an icon view of a user interface for managing automation settings for a device, in accordance with some example embodiments.

FIG. 4B shows an icon view of a user interface for managing automation settings for a device 400B, in accordance with some example embodiments. Device 400B can be any electronic device, such as a smart phone, a tablet computer, a pocket computer, a device integrated with a car system, or a network appliance. In one embodiment, device 400B can be used to implement the method shown in FIG. 1. When used in this manner, device 400B will first collect data on a user's activities to observe and learn about the user's behavior. Then one or more automation settings can be generated by device 400B based on the user's behavior, and presented to the user for customizing the device. FIG. 4B shows an icon view for presenting the one or more automation settings to the user. In particular, FIG. 4B shows four icons (i.e., 450, 460, 470, and 480) associated with four different automation settings. In one embodiment, icon 450 can correspond to the automation setting associated with item 410 of FIG. 4A. Similarly, icons 460, 470, and 480 can correspond to the automation settings associated with items 420, 430, and 440 of FIG. 4A, respectively.

In one embodiment involving an icon view, an icon can represent one automation setting presented to the user for customizing the device. In another embodiment, an icon can represent a link to a group of automation settings presented to the user for customizing the device. When an icon represents one automation setting, the user can select the automation setting associated with the icon by clicking on the icon. In one embodiment, clicking on the icon enables the automation setting. In another embodiment, clicking on the icon does not enable the automation setting, so the enabling has to occur through some other means. When an icon represents a group of automation settings, the user can select the group of automation settings associated with the icon by clicking on the icon. Then the group of automation settings can be presented to the user for the user to select the automation settings that will be enabled.

Figure 5:
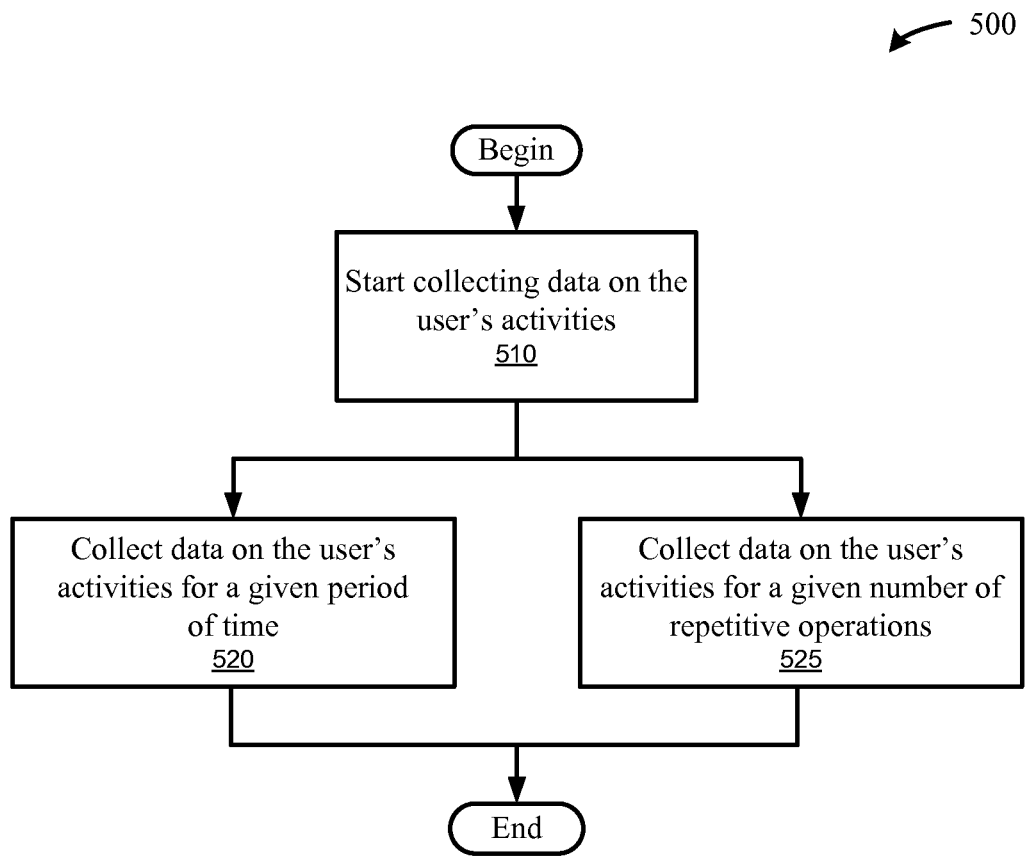
FIG. 5 shows a flow chart of method steps for collecting data on a user's activities, in accordance with some example embodiments.

For the step of collecting data on the user's activities as shown in step 110 of FIG. 1, there can be many ways to collect the data. FIG. 5 shows two embodiments for collecting this data, but other embodiments are also possible (e.g., using a combination of "a given period of time" and "a given number of repetitive operations"). Embodiment one is illustrated by steps 510 and 520, while embodiment two is illustrated by steps 510 and 525. In embodiment one, the method 500 begins at step 510, where the method starts collecting data on the user's activities. Then, at step 520, the method collects data on the user's activities for a given period of time (i.e., for a given number of hours or days or weeks or months). For example, this given period of time can be for three weeks. Meanwhile, background software can be used to collect, compute, and analyze this data. As an example, the data collected might show that an audio alarm is to be set every weekday (i.e., Monday to Friday) morning at 7 am. Presumably, observing and learning for a long period of time (e.g., three weeks) would be sufficient to understand the user's behavior with regards to some routine operations (e.g., setting an audio alarm). Initially, this period of time can be preset to a default value. Then the user (or the method through intelligent analysis/logic) can have the option of setting it to a new value. In embodiment two, the method 500 begins at step 510, where the method starts collecting data on the user's activities. Then, at step 525, the method collects data on the user's activities for a given number of repetitive operations. For example, this can be a repetitive operation of turning off phone ringing and the device might be set to collect data for 50 repetitive operations (e.g., 50 times of turning off phone ringing). Meanwhile, background software can be used to collect, compute, and analyze this data. As an example, the data collected might show that the phone ringing is to be turned off during a certain time (e.g., during Monday 8 am to 9 am meeting time) or when the device is at a certain place (e.g., at work, at the theater, in court). Presumably, observing and learning from a large number (e.g., 50 times) of these repetitive operations would be sufficient to understand the user's behavior with regards to this operation (e.g., turning off phone ringing). Initially, this number of repetitive operations can be preset to a default value, say 50. Then the user (or the method through intelligent analysis/logic) can have the option of setting it to a new value. In one embodiment, this number of repetitive operations can be just a set point for the method to present proposed automation settings to the user for approval to implement on the device, since the method can continue to accumulate data of the repetitive operations for analysis. However, the method can also be "intelligent" to detect possible changes in user behavior, so the accumulation of the data should start afresh at points when the user behavior has changed (e.g., user changes job and goes to a new workplace). Of course, the method can also depend on the user instructing the method that the automation settings should be changed, because of a change in the user's routine (e.g., user changes job and goes to a new workplace). Other embodiments are also possible, but the key point is the method learning together with the user what is the user's behavior.

Figure 6:
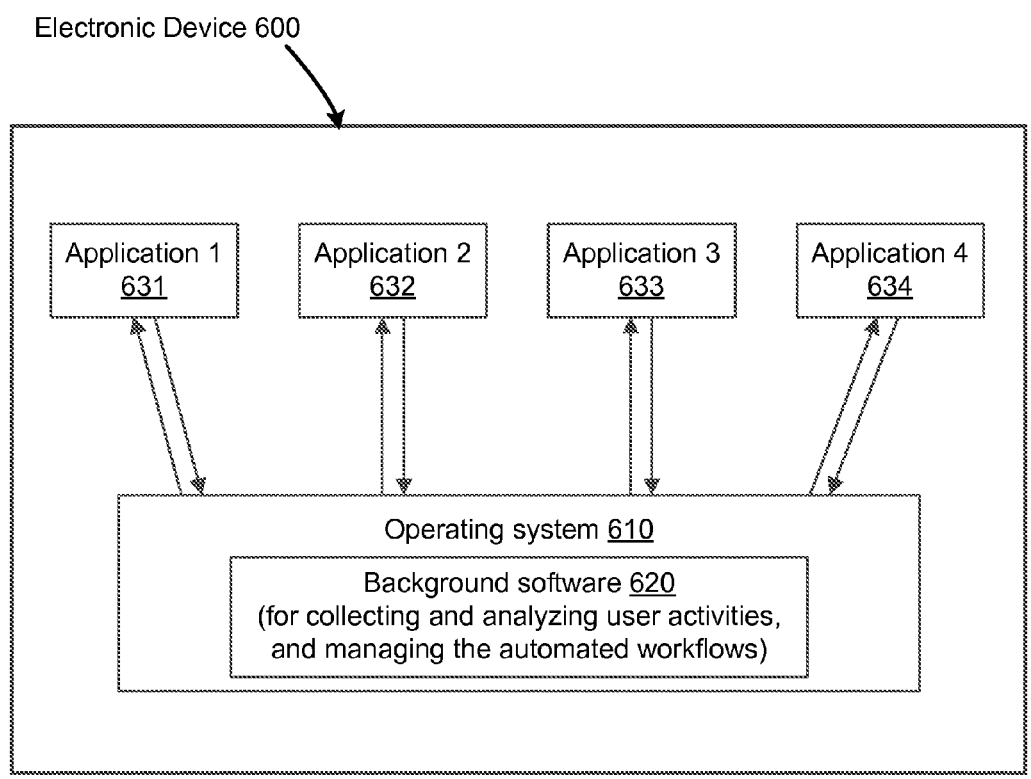
FIG. 6 shows a block diagram of an electronic device running a background software (which is used for collecting and analyzing user activities, as well as managing the automated workflows) that is integrated with the native operating system, in accordance with some example embodiments.

FIG. 6 shows an electronic device 600, such as a smart phone, running on an operating system 610, such as a generic mobile operating system. FIG. 6 shows that background software 620 (which is used for collecting and analyzing user activities, as well as managing the automated workflows) can be integrated with the native operating system 610, in accordance with some example embodiments. Electronic device 600 also includes application 1 (631), application 2 (632), application 3 (633), and application 4 (634), which runs on top of the operating system 610. Since the background software 620 (which is used for collecting and analyzing user activities, as well as managing the automated workflows) is integrated with the operating system and not running parallel with the other application (e.g., application 1, application 2, application 3, and application 4), the operating system can be directly controlling the opening up or shutting down of any applications associated with the automated workflows. In particular, the automated workflows are associated with the automation settings generated based on the user's behavior for performing certain routine repetitive custom operations. In a completely different embodiment, the background software (which is used for collecting and analyzing user activities, as well as managing the automated workflows) can also be run as another application on top of the operating system, but, since it needs to go through the operating system for starting other applications associated with the automation settings, it will not be as efficient as the embodiment where the background software (which is used for collecting and analyzing user activities, as well as managing the automated workflows) is integrated with the native operating system.

As previously described, the methods and systems disclosed in this application can utilize software logics that are adaptive to change, helping the user to customize the device for more efficient operations. As such, there are no preset rules, such as a default set of automation settings, for device customization. On one hand, it is too difficult to generate a default set of preset rules that will work for all types of users. On the other hand, even if there can be some sort of rough grouping for the different types of users (e.g., casual occasional user, professional heavy user, etc.), the default device customization for each group is probably still too generic to be useful for any one particular user. Therefore, device customizing must be performed individually for each user. Accordingly, one approach can be for each user to individually generate all the automation settings manually. However, that is a tedious process for the user, as the user must generalize in the user's mind what are the automated workflows that the user might need. Alternatively, a more efficient process could use the computing and storage power of the device to collect user activities data and help determine the relevant automated workflows that the user might need. However, the device can only propose and suggest the automated workflows (or the corresponding automation settings), since the user is ultimately the only one who can make the right decision as to whether an automation setting will be helpful. Therefore, the methods and systems presented in this disclosure use an adaptive/learning approach for formulating the final automation settings. In the adaptive/learning approach, both the user and the device play a role in formulating the final automation settings, with both parties participating in a manner that maximizes their advantages. For example, the device is very good at recording a lot of data and summarizing the data, while the user is very good at deciding if a suggested automated setting actually fulfills a need for the user. Accordingly, this is exactly how the disclosed methods and systems generate and implement the automation settings, as shown in the FIG. 1 embodiment.

In one embodiment, the methods and systems disclosed can include the ability to learn, orchestrate and personalize customization for and across multiple (i.e., more than one) devices. In one embodiment, multiple devices can share the same operating system, such as Apple's iOS mobile operating system. In one embodiment, the multiple devices can have different operating systems. In one embodiment, some or all of the device customization can be shared across multiple devices. In one embodiment, the sharing can be through a cloud storage and cloud computing service. However, in one embodiment, some of the device customization can be different for the different devices, since different devices can have different attributes. For example, a mobile device can have a location variable, while a stationary device would not have a location variable. Further, the different devices can learn about the user behavior separately, or the different devices can learn about the user behavior jointly. In this regard, some aspects of the user behavior can be the same for multiple devices, so that these aspects of the user behavior that are the same for multiple devices can be shared among the multiple devices.

In one embodiment, a screen capture of a workflow can be used for providing data to the automation process. This method can begin with a screen recording. Then, as information, such as banking information for special banking application, is added to the screen, this information can be captured and added to the automation process. In one embodiment, the user can also manually provide information to the automation process.

In one embodiment, default automation settings, such as power saver and location based notification triggers, can be provided. In another embodiment, the automation process can be integrated with a device control center, a device notification center, and a cloud storage/computing service. A device control center can give a user system-wide control access to features such as file sharing settings, screen brightness, camera, clock, system volume, music playback, Airplane Mode enable and disable, WiFi, Bluetooth, Do Not Disturb, and system mute. A device notification center can serves as a central repository for system and application notifications. Examples of notifications include new mail, missed calls, and to-dos that need doing. In one embodiment, this can also include notification of the next automation run. A cloud storage/computing service, such as Apple's iCloud, allows for storage of data on remote computer servers for download to multiple devices. As such, the device customization (i.e., the entire set of automation settings) and the user activities data can all be stored on remote computer servers for sharing and download to other devices of the user.

In one embodiment, the automation process can provide a device customization that optimizes for the longest battery life possible by minimizing the battery usage. For example, usage of the GPS locator can be a drain on the battery power, so the method can determine that a user is at a particular location (say at work) during a particular period of time. Then the GPS detector can be turned off for that particular period of time, saving battery power. Furthermore, the method can also provide a graph to the user that displays the benefits of the device customization in prolonging battery life.

In one embodiment, the automation process includes a single switch control that can turn the entire set of automation settings on or off. In this regard, the device customization associated with entire set of automation settings can be operated like a cruise control on an automobile, where a user can either operate the automobile in manual mode (i.e., cruise control off) or automatic mode (i.e., cruise control on). In other words, a single switch control can either operate the device in either manual mode (i.e., all automation settings disabled) or automatic mode (i.e., all automation settings enabled). Further, this single switch control engages seamlessly with the device, providing the user with the ability to stop or override the automation at any point in time. Of course, individual control of each automation setting is also possible, so that each automation setting can be separately enabled or disabled. In one embodiment, the individual automation setting can be control through a switch, such as button 340 shown in FIGS. 3A and 3B.

In one embodiment, the automation process can include the ability to identify and differentiate between multiple users sharing a common device. In one embodiment, the different users can be differentiated based on different login accounts, so that behavior for each user can be determined based on the activities data for that user as established through that user's login account. In another embodiment, the different users can be differentiated based on different patterns of user behavior.

In one embodiment, inputs from other applications, such as a user's calendar, can be used to help generate the automation settings. For example, the phone ringing can be made to be turned off during scheduled meeting times, which are provided for by a calendar application. As another example, the phone ringing can also be made to be turned off during a visit to a court, where no phone ringing is allowed. Once again, the court visit time can be provided for by a calendar application.

In one embodiment, the systems and methods described in this application can evolve into an automation platform, where contributions from other developers can be incorporated and taken forward. In another embodiment, other application programming interfaces (APIs) can also be provided going forward.

Figure 7:
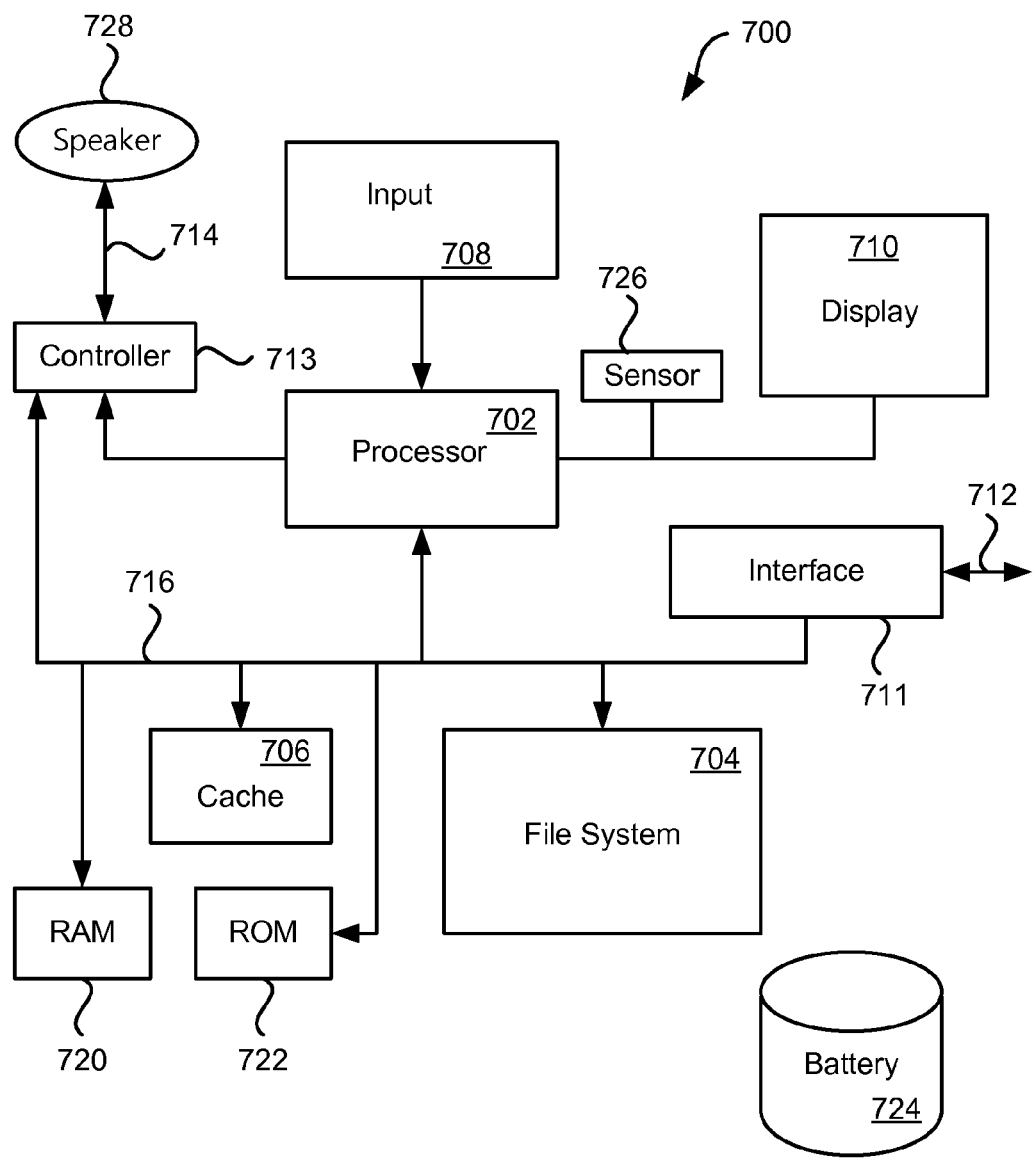
FIG. 7 shows a block diagram of an electronic device suitable for use with the described embodiments.

FIG. 7 is a block diagram of an electronic device suitable for controlling some of the processes in the described embodiment. Electronic device 700 can illustrate circuitry of a representative computing device. Electronic device 700 can include a processor 702 that pertains to a microprocessor or controller for controlling the overall operation of electronic device 700. Electronic device 700 can include instruction data pertaining to operating instructions, such as instructions for implementing and controlling a user equipment, in a file system 704 and a cache 706. File system 704 can be a storage disk or a plurality of disks. In some embodiments, file system 704 can be flash memory, semiconductor (solid state) memory or the like. The file system 704 can typically provide high capacity storage capability for the electronic device 700. However, since the access time for the file system 704 can be relatively slow (especially if file system 704 includes a mechanical disk drive), the electronic device 700 can also include cache 706. The cache 706 can include, for example, Random-Access Memory (RAM) provided by semiconductor memory. The relative access time to the cache 706 can be substantially shorter than for the file system 704. However, cache 706 may not have the large storage capacity of file system 704. Further, file system 704, when active, can consume more power than cache 706. Power consumption often can be a concern when the electronic device 700 is a portable device that is powered by battery 724. The electronic device 700 can also include a RAM 720 and a Read-Only Memory (ROM) 722. The ROM 722 can store programs, utilities or processes to be executed in a non-volatile manner. The RAM 720 can provide volatile data storage, such as for cache 706.

Electronic device 700 can also include user input device 708 that allows a user of the electronic device 700 to interact with the electronic device 700. For example, user input device 708 can take a variety of forms, such as a button, keypad, dial, touch screen, audio input interface, visual/image capture input interface, input in the form of sensor data, etc. Still further, electronic device 700 can include a display 710 (screen display) that can be controlled by processor 702 to display information, such as web pages, to the user. Data bus 716 can facilitate data transfer between at least file system 704, cache 706, processor 702, and input/output (I/O) controller 713. I/O controller 713 can be used to interface with and control different devices such as speakers, ear buds, microphone or video cameras through appropriate codecs. For example, control bus 714 can be used to control speaker 728.

Electronic device 700 can also include a network/bus interface 711 that couples to data link 712. Data link 712 can allow electronic device 700 to couple to a host computer or to accessory devices or to other networks such as the internet. The data link 712 can be provided over a wired connection or a wireless connection. In the case of a wireless connection, network/bus interface 711 can include a wireless transceiver, such as a wireless transceiver configured to transmit and receive data according to the LTE (Long Term Evolution) protocol. Sensor 726 can take the form of circuitry for detecting any number of stimuli. For example, sensor 726 can include any number of sensors for monitoring environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, HDDs (hard disk drives), SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing and automating a customization of a computing device, the method comprising:
   by the computing device:
      receiving a first plurality of inputs performed in association with a first user account known to the computing device;
      analyzing the first plurality of inputs to determine a repetitive activity history associated with the first user account;
      generating a prospective automation setting that is based on the repetitive activity history, wherein the prospective automation setting includes proposed values for properties of the prospective automation setting;
      displaying the prospective automation setting within a graphical user interface (GUI) according to a calendar-based view, wherein:
         the GUI enables alternative values for properties of the prospective automation setting to be selected over the proposed values for the properties of the prospective automation setting, and
         the GUI enables the prospective automation setting to be approved for activation; and
      when the prospective automation setting is approved for activation:
         converting the prospective automation setting to an active automation setting, and
         implementing the active automation setting.

2. The method of claim 1, wherein the GUI further enables the prospective automation setting to be denied.

3. The method of claim 1, further comprising:
   receiving a second plurality of inputs performed in association with a second user account known to the computing device; and
   analyzing the second plurality of inputs to generate a second prospective automation setting for the second user account.

4. The method of claim 1, further comprising:
   receiving a second plurality of inputs performed in association with the first user account; and
   modifying the prospective automation setting for the first user account in accordance with the second plurality of inputs.

5. The method of claim 1, wherein the properties of the prospective automation setting include at least one of a date, a time span, a location, a configuration setting, and a description.

6. The method of claim 1, further comprising:
   receiving a request to display the prospective automation setting within the GUI according to an icon-based view, and
   updating the GUI to display the prospective automation setting according to the icon-based view, wherein at least one icon included in the GUI represents at least one automation setting.

7. The method of claim 1, wherein the first plurality of inputs specify different configuration changes to the computing device according to times, dates, and/or locations.

8. A computing device configured to present a prospective automation setting based on a repetitive activity, the computing device comprising:
   at least one processor; and
   at least one memory storing computer executable instructions that when executed by the at least one processor, causes the computing device to:
      collect a first plurality of inputs performed in association with a first user account known to the computing device;
      analyze the first plurality of inputs to determine a repetitive activity history associated with the first user account;
      generate the prospective automation setting based on the repetitive activity history, wherein the prospective automation setting
      includes proposed values for properties of the prospective automation setting;
      display the prospective automation setting within a graphical user interface (GUI) according to a calendar-based view, wherein:
         the GUI enables alternative values for properties of the prospective automation setting to be selected over the proposed values for the properties of the prospective automation setting, and
         the GUI enables the prospective automation setting to be approved for activation; and
      when the prospective automation setting is approved for activation:
         convert the prospective automation setting to an active automation setting, and
         implement the active automation setting.

9. The computing device of claim 8, wherein the GUI further enables the prospective automation setting to be denied.

10. The computing device of claim 8, wherein the at least one processor further causes the computing device to:
   receive a second plurality of inputs performed in association with a second user account known to the computing device; and analyze the second plurality of inputs to generate a second prospective automation setting for the second user account.

11. The computing device of claim 8, wherein the at least one processor further causes the computing device to:
   receive a second plurality of inputs performed in association with the first user account; and
   modify the prospective automation setting for the first user account in accordance with the second plurality of inputs.

12. The computing device of claim 8, wherein the properties of the prospective automation setting include at least one of a date, a time span, a location, a configuration setting, and a description.

13. At least one non-transitory computer readable medium storing instructions that, when executed by at least one processor included in a computing device, cause the computing device to carry out steps that include:
   collecting a first plurality of inputs performed in association with a first user account known to the computing device;
   analyzing the first plurality of inputs to determine a repetitive activity history associated with the first user account;
   generating a prospective automation setting that is based on the repetitive activity history, wherein the prospective automation setting includes proposed values for properties of the prospective automation setting;
   displaying the prospective automation setting within a graphical user interface (GUI) according to a calendar-based view, wherein:
      the GUI enables alternative values for properties of the prospective automation setting to be selected over the proposed values for the properties of the prospective automation setting, and
      the GUI enables the prospective automation setting to be approved for activation; and
   when the prospective automation setting is approved for activation:
      converting the prospective automation setting to an active automation setting, and
      implementing the active automation setting.

14. The at least one non-transitory computer readable medium of claim 13, wherein the GUI further enables the prospective automation setting to be denied.

15. The at least one non-transitory computer readable medium of claim 13, wherein the steps further include:
   receiving a second plurality of inputs performed in association with a second user account known to the computing device; and
   analyzing the second plurality of inputs to generate a second prospective automation setting for the second user account.

16. The at least one non-transitory computer readable medium of claim 13, wherein the steps further include:
   receiving a second plurality of inputs performed in association with the first user account; and
   modifying the prospective automation setting for the first user account in accordance with the second plurality of inputs.

17. The at least one non-transitory computer readable medium of claim 13, wherein the properties of the prospective automation setting include at least one of a date, a time span, a location, a configuration setting, and a description.

18. The at least one non-transitory computer readable medium of claim 13, wherein the steps further include:
   receiving a request to display the prospective automation setting within the GUI according to an icon-based view, and
   updating the GUI to display the prospective automation setting according to the icon-based view, wherein at least one icon included in the GUI represents at least one automation setting.

19. The at least one non-transitory computer readable medium of claim 13, wherein the first plurality of inputs specify different configuration changes to the computing device according to times, dates, and/or locations.

20. The computing device of claim 8, wherein the first plurality of inputs specify different configuration changes to the computing device according to times, dates, and/or locations.

* * * * *